United States Patent [19]

Stevick

[11] 4,180,155
[45] Dec. 25, 1979

[54] MULTIPLE PITCH SELF-CLEANING BELT PULLEY

[75] Inventor: Ronald A. Stevick, Cement City, Mich.

[73] Assignee: Industrial Service & Manufacturing Co., Clark Lake, Mich.

[21] Appl. No.: 885,862

[22] Filed: Mar. 13, 1978

Related U.S. Application Data

[63] Continuation-in-part of Ser. No. 746,304, Dec. 1, 1976, abandoned.

[51] Int. Cl.² ............................................. B65G 45/00
[52] U.S. Cl. ................................. 198/498; 198/842; 198/669; 74/230
[58] Field of Search ............... 74/230, 230.01, 230.05, 74/230.7, 241, 243 C; 198/494, 498, 662, 663, 842, 669

[56] References Cited

U.S. PATENT DOCUMENTS

| 1,684,254 | 9/1928 | Bailey | 198/676 |
| 2,660,429 | 11/1953 | Lorig | 74/241 |
| 2,886,169 | 5/1959 | Calder | 198/498 |
| 3,055,229 | 9/1962 | Mecham | 198/494 |
| 3,626,773 | 12/1971 | Loeffler | 74/230 |

FOREIGN PATENT DOCUMENTS

| 2717085 | 11/1977 | Fed. Rep. of Germany | 198/498 |
| 549387 | 9/1977 | U.S.S.R. | 198/498 |

Primary Examiner—Benjamin Wyche
Assistant Examiner—David C. Reichard
Attorney, Agent, or Firm—Beaman & Beaman

[57] ABSTRACT

The invention pertains to a pulley for belt conveyors, particularly belt conveyors used in the conveying of stones, gravel, and the like wherein the pulley structure is self-cleaning of foreign matter received within the confines of the pulley to prevent belt damage. The pulley consists of a plurality of helically disposed webs spiralled about a rotatable shaft. A plurality of webs are defined upon the shaft on each side of the pulley central region wherein at least two separate webs define a set of multiple pitch helices, and each set is spiralled about the axis of rotation in an opposite direction wherein foreign matter received between the webs is moved to the pulley ends in a self-cleaning manner. A disc is utilized at the pulley central region to which the inner ends of the web sets are affixed and the periphery of the webs is of a greater axial dimension than the web plate to increase the belt surface loading area. The use of a plurality of helices in each web set increases the locations of belt engagement and support without detracting from the self-cleaning function.

5 Claims, 5 Drawing Figures

MULTIPLE PITCH SELF-CLEANING BELT PULLEY

REFERENCE TO RELATED APPLICATION

This application is a continuation-in-part of Ser. No. 746,304 filed Dec. 1, 1976, now abandoned.

BACKGROUND OF THE INVENTION

The invention pertains to self-cleaning pulleys for belt conveyor systems utilizing helically spiralled belt supporting webs.

Belt conveyors are widely used in the bulk handling of material which may consist of a plurality of hard particles such as stones, rocks, coal and the like. A typical belt conveyor used in the stone and gravel processing art, for instance, would include a motor driven upper drive pulley, a lower idler or tail pulley, and a flexible belt passing over the drive and tail pulleys usually supported intermediate the pulleys by a belt guide or auxiliary rollers which permit the conveyor to form a concave configuration to maintain the material upon the belt.

Such conveyors are usually inclined at a relatively steep angle to the horizontal and due to the vibration of the conveyor and the movement of the rock and gravel particles thereon it is not unusual for rocks and stones to fall from the conveyor at a point above the tail pulley. Such matter falling from the conveyor will often engage the inner sides of the return portion of the conveyor belt which is travelling downwardly toward the tail pulley, or the particle may fall directly into the region of the belt conveyor at the tail pulley, and in such instances the particle may become wedged between a conventional tail pulley surface and the belt. The presence of the particles between the pulley and the belt will stress the belt at a localized point often cutting or ripping the belt, and may possibly damage the pulley. Additionally, such an occurrence may cause misalignment of the belt on the pulley causing the belt to be thrown.

The aforementioned problems can be partially controlled by utilizing shields and pulley baffles, but such devices are troublesome and require constant maintenance and adjustment, and are easily damaged.

Another approach to solving the aforementioned problem has been the use of self-cleaning pulleys utilizing helical webs spiralled in opposite directions from the central region of the pulley wherein foreign matter received within the pulley is conveyed from the pulley ends, and such devices, while patented, have not achieved commercial success. Such self-cleaning pulleys are shown in U.S. Pat. Nos. 2,886,168, Calder, and 3,626,773, Loeffler, and British Pat. No. 810,804. However, such patented devices have the disadvantage of only supporting the conveyor belt at a single point at any axial location on the pulley resulting in high conveyor belt loads at the location of pulley engagement therewith, and such patented devices do not provide adequate support of the belt conveyor at the pulley central region and ends.

SUMMARY OF THE INVENTION

It is an object of the invention to provide a pulley for belt conveyor systems which is self-cleaning in operation whereby foreign particles entering the confines of the pulley are axially translated from the pulley configuration.

A further object of the invention is to provide a self-cleaning pulley for use with conveyor belts wherein the pulley consists of a plurality of helical webs coaxially disposed about an axis of rotation, a plurality of helical webs defining a set being associated on each side of the pulley central region producing a multiple pitch helices which provides at least two belt engaging locations at each pulley axial location resulting in superior belt supporting characteristics and reduced belt and pulley loading forces.

An additional object of the invention is to provide a self-cleaning pulley for use with conveyor belts utilizing a plurality of helical webs at each axial location of the pulley from the pulley central region, the diameter of the webs adjacent the central region being greater than the web's diameter at the pulley ends whereby the pulley is crowned to facilitate centering of the belt thereon during operation.

A further object of the invention is to provide a self-cleaning pulley for use with conveyor belts wherein a plurality of intermeshed helical webs are utilized upon each side of the pulley central region to provide a plurality of helical sets, and the pulley central region includes a circular disc to which the inner ends of the webs are affixed, and which also includes a belt supporting periphery at the central region throughout the pulley's circumference.

In the practice of the invention the pulley is defined by a rotatable shaft having a plurality of webs helically mounted thereon in a spiral manner. The webs include an inner edge affixed to the shaft, and an outer edge which defines a belt engaging periphery. The outer edge is provided with a band of an axial width greater than the thickness of the webs to reduce belt loading pressure, and the webs on opposite sides of the pulley central region are spiralled in opposite directions wherein foreign matter received within the webs is axially translated from the central region for self-cleaning purposes, and equalized belt engaging forces are produced by the pulley to maintain the belt centered thereon.

A significant feature of the invention lies in the fact that a multiple pitch web is utilized on each side of the pulley central region. This multiple pitch web is produced by using a plurality of webs, at least two, having a relatively large pitch whereby one web may be located intermediate the other to define a double helices, the double helices together defining a helical set. The sets on opposite sides of the central region spiral in opposite directions about the shaft axis, and the use of the double helices results in at least two pulley peripheral locations capable of belt engagement for each pulley axial location.

The presence of the circular disc at the pulley central region assures uniform engagement and support of the belt at the central region improving the belt running characteristics without sacrificing any of the self-cleaning aspects of the invention.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
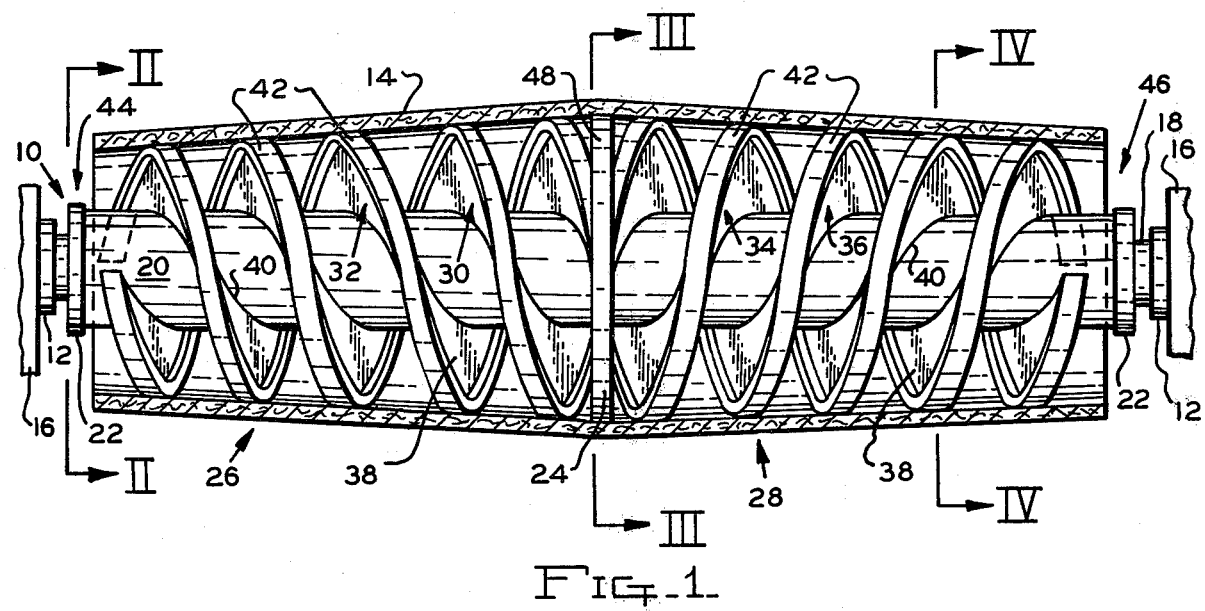
FIG. 1 is an elevational view of a pulley in accord with the invention, partially sectioned, and illustrating a conveyor belt disposed thereon.

As will be appreciated from FIG. 1, a self-cleaning pulley in accord with the inventive concepts includes a cylindrical shaft assembly 10 rotatably supported upon bearings 12. The pulley would normally be utilized as a tail or idler pulley about which a flexible conveyor belt 14 passes in changing direction. In most gravel processing systems the tail pulley will be located at the lower region of the belt conveyor wherein a motor driven drive pulley, not shown, located at the upper end of the belt conveyor system provides the power to translate the belt 14. Accordingly, the bearings 12 would normally be of the anti-friction type mounted in side rails 16 of the belt conveyor apparatus, and the pulley is rotated solely by the rotative force imposed upon the pulley by the belt.

In a commercial embodiment of the invention the shaft assembly 10 includes an inner shaft 18 which is journaled within the bearings 12 and the outer hollow shaft 20 concentrically circumscribes the shaft 18 and is coaxially affixed thereto by sleeve end caps 22. The end caps 22 may incorporate known bushing structures for accurately concentrically locating the shaft 20 upon the shaft 18, and this particular bushing structure constitutes no part of the present invention.

The belt supporting structure of the pulley comprises a central disc 24 affixed to the shaft 20 at its central region and web sets generally indicated at 26 and 28. A web set is located upon each axial side of the central disc 24 and the web sets are identical in configuration except that they are mirror images of each other, web set 26 being spiralled in a "right hand direction" while web set 28 is helically spiralled in a "left hand direction" about the axis of shaft 20.

In the illustrated embodiment each web set consist of two helical webs formed of plate material of substantial pitch whereby one web of the set may be located within the helices of the other web to form a double helices similar in concept to a double thread. Web set 26 consists of webs 30 and 32, and set 28 consists of webs 34 and 36.

Each web includes a radial portion 38 formed of plate material, such as one-eight inch steel plate which is of a continuous smooth configuration throughout its radial and axial length. Each web also includes an inner edge 40 which is welded to the shaft 20, and the webs also include an outer edge which constitutes a belt supporting surface. The outer edges are defined by a rim or band 42 of a rectangular cross sectional configuration as will be appreciated from FIG. 4, and the axial width of the bands 42 is significantly greater than the thickness of the web plate 38 wherein the periphery of the web is of a T-shaped cross sectional configuration. The bands are preferably welded to the web plate outer portion, and the axial dimension of the band 42 is such as to significantly reduce the area loading pressures imposed on the belt by the pulley in order to achieve greater belt life and better belt running characteristics.

In the interest of belt running characteristics it is also desirable that the pulley be "crowned" and in this respect the diameter of the webs gradually increases from the pulley ends as generally indicated at 44 and 46 to the central region disc 24, as will be appreciated from FIG. 1.

Figure 3:
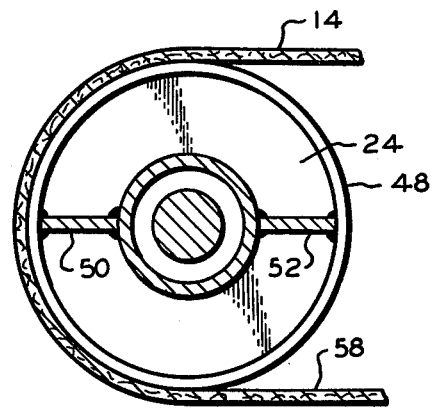
FIG. 3 is an elevational sectional view taken adjacent the pulley central region along Section III—III of FIG. 1.

The central region disc 24 is of a circular configuration as will be apparent from FIG. 3, and a band 48 is welded to the circular periphery thereof wherein the maximum diameter of the pulley is defined by the disc, and, at its center, the pulley is provided with a 360° belt supporting surface, which significantly improves the belt running characteristics as compared with known self-cleaning pulleys.

The inner end 50 of the web 30, and the inner end 52 of the web 32, as well as the inner ends of the webs 34 and 36 of set 28 are disposed adjacent the central disc 24, and are preferably welded thereto, and this fabrication insures high strength support of the inner ends of the webs, while also strengthening the central disc.

Figure 2:
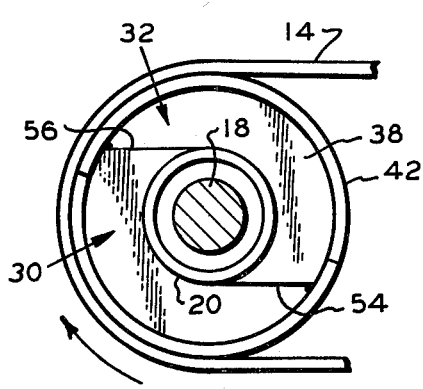
FIG. 2 is an end elevational sectional view of the pulley as taken along Section II—II of FIG. 1.

As will be appreciated from FIG. 2, the outer ends of the webs 30 and 32 are represented at 54 and 56, respectively, and these edges are tangential to the shaft 20. The use of a plurality of webs in each set permits the belt edges to be supported at two locations, at least during a portion of the pulley rotation, and the plurality of webs within a set provides superior belt support adjacent the pulley ends 44 and 46 as compared with self-cleaning pulleys having only a single spiral web.

Figure 4:
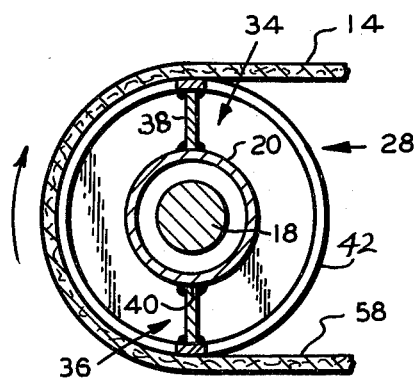
FIG. 4 is an elevational sectional view as taken through a web set along Section IV—IV of FIG. 1.
Figure 5:
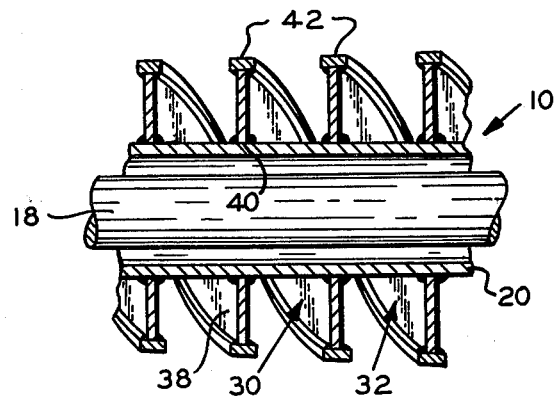
FIG. 5 is a detail, cross sectional, diametrical view of a portion of a web set in accord with the invention.

As will also be appreciated from FIG. 4, at any plane taken at right angles to the shaft axis, as represented by Section IV—IV, such a plane will intersect the web's peripheral band 42 at two locations at 180° intervals constituting a plurality of support points of the belt during pulley rotation at each pulley axial location, and such use of a plurality of helices in each web set provides significantly greater belt wear and improved running characteristics over single web self-cleaning pulleys.

In operation, the belt 14 will normally be driven in a single direction during conveying. Reversal of the direction of belt movement is unusual, and would occur only for a few or partial pulley rotations that might be needed to repair the belt or otherwise clear the machine. As viewed in the drawings, the direction of normal pulley rotation is clockwise, as indicated by the arrows.

During operation, gravel, rocks, stones and foreign matter falling upon the return portion 58 of the belt 14, FIG. 2, may enter the radial confines of the web sets 26 and 28. However, because of the spacing between the helices of a web set the rocks, stones, etc. will be located between the helices, rather than between the belt engaging band 42 and belt 14, and the direction of spiral of the webs will axially translate the foreign matter toward the nearest pulley end. Thus, this self-cleaning action of the pulley permits even relatively large amounts of foreign matter to be quickly cleared from the pulley, and the fact that the web sets are of a multiple pitch will cause an axial displacement of the foreign matter considerably faster than occurs when a single helical web is used.

In the disclosed embodiment the web sets 26 and 28 each consist of two webs to define a double helices. It is within the concept and scope of the invention that a web set could consist of three, four or more helices, each web having an inner end disposed adjacent the central disc 24, and an outer end disposed adjacent a pulley end 44 or 46. For instance, with a triple helices, at each axial location of the pulley three belt engaging locations will exist disposed at 120° intervals, and in a quadruple helices web four belt engaging locations exist for each pulley axial location disposed at 90° intervals about the shaft axis. Such three and four web sets have the advantage of providing even more belt supporting locations per axial segment than a two web set, but it will be appreciated that the advantages of such a higher number of web per set with respect to belt supporting capabilities is offset by higher manufacturing costs and a reduction in the axial spacing between adjacent webs as to accommodate large stones or rocks which may fall into the pulley.

It is appreciated that various modifications to the inventive concept may be apparent to those skilled in the art without departing from the scope of the invention.

I claim:

1. A pulley for a belt conveyor or the like adapted to primarily rotate in a given direction about a longitudinal axis and characterized by its self-cleaning and belt supporting ability comprising, in combination, a shaft defining an axis of rotation, said shaft including first and second ends and a central region intermediate said ends, a plurality of radially disposed webs formed of plate material helically circumscribing said shaft, said webs each including an inner edge disposed adjacent said shaft and an outer edge radially spaced from said shaft, at least two webs extending from said central region to said first end constituting a first web set and at least two webs extending from said central region to said second end constituting a second web set, the webs of a set being helically disposed about said shaft in a common direction and each web having an inner end located at said central region and an outer end located adjacent a common shaft end, said webs of a set being interspaced between each other defining a multiple helix wherein a plane at right angles to said shaft axis intersecting a web set intersects at least two web outer edges, the webs of said first set being helically disposed about said shaft in a direction opposite to that of the webs of said second set and in such a direction relative to said given direction of pulley rotation that foreign matter within a web set is axially translated in a direction from said shaft central region toward a shaft end for discharge from the web at a shaft end, a circular disc affixed to said shaft central region lying in a plane substantially perpendicular to said shaft axis, said disc having an outer edge defining a diameter substantially equal to the diameter of said webs' inner ends constituting a belt supporting periphery and said webs' inner ends terminating at said disc, said webs' and disc's outer edges constituting a belt supporting periphery and being of an axial dimension greater than the thickness of the plate material forming said webs and disc.

2. In a pulley for a belt conveyor as in claim 1, the radial spacing of said webs' outer edge from said shaft being greater at said webs' inner ends than at said webs' outer ends whereby said webs' outer edges define a crown at the shaft central region and disc.

3. In a pulley for a belt conveyor as in claim 1 wherein said webs' inner edges are welded to said shaft.

4. In a pulley for a belt conveyor as in claim 1 wherein said webs' inner ends are affixed to said disc.

5. In a pulley for a belt conveyor as in claim 1, wherein said webs' and disc's belt supporting periphery is defined by a band affixed to said webs' and disc's outer edge, said band having a width in the axial direction of said shaft greater than the thickness of said web plate material whereby said webs' and disc's outer edge is of a T-shaped transverse cross section to minimize belt wear and reduce the belt surface area loading pressure at belt contact.

* * * * *